Aug. 16, 1960

M. CARON ET AL 2,949,495

VACUUM FURNACE FOR VAPOURISING THE
VOLATILE CONSTITUENT OF AN ALLOY

Filed Sept. 29, 1958

2 Sheets-Sheet 1

INVENTORS
MICHEL CARON
GEORGES CHAUDRON
LEON MOREAU

BY Baron+Thomas

ATTORNEYS

INVENTORS
MICHEL CARON
GEORGES CHAUDRON
LEON MOREAU

ATTORNEYS

United States Patent Office 2,949,495
Patented Aug. 16, 1960

2,949,495

VACUUM FURNACE FOR VAPOURISING THE VOLATILE CONSTITUENT OF AN ALLOY

Michel Caron, Sevres, Georges Chaudron, Paris, and Léon Moreau, Vitry, France, assignors to Commissariat a l'Energie Atomique, Paris, France Filed Sept. 29, 1958, Ser. No. 764,157

Claims priority, application France Oct. 7, 1957

1 Claim. (Cl. 13—8)

The present invention relates generally to the manufacture of porous membrane by evaporation, under vacuum, of the volatile constituent of an alloy, particularly the zinc of a brass or German silver.

More particularly, the invention relates to a furnace which is adapted to effect the treatment of bands of brass to be dezincified and in which a suitable temperature, of the order of 650° C., and a vacuum of the order of $10^{-4}$ mm. of mercury, are maintained. This vacuum is obtained with the aid of a pump of which the output must be sufficient to permit the rapid evacuation of the zinc vapours in the vicinity of the band of brass. The furnace must comprise regions which are cooled by a circulation of water and on which the zinc is deposited.

However, in a furnace of this kind there is a risk on the one hand that the zinc may recondense on the parts of the band of brass which have already been dezincified, and on the other hand that the vapourisation of the zinc may cause short-circuits in the heating furnace.

The present invention relates to a vacuum furnace for the vapourisation of the volatile constituent of an alloy, for instance the zinc of a band of brass or German silver, which will avoid the above-mentioned disadvantages and permit the discontinuous manufacture of such bands.

A vacuum furnace of this kind is essentially characterised in that it comprises in combination a cylindrical chamber which is kept under vacuum and of which the heating is ensured by peripheral resistances covered by a refractory material and protected by plates made of an electrically insulating material, a rotating cylindrical container coaxial with the said chamber and supporting the bands of metal of which the volatile constituent is to be eliminated, a coaxial perforated cylindrical screen disposed for instance inside, in the vicinity of the said container, and a central condenser consisting of a hollow tube through which a cooling fluid passes and which is provided with vanes collecting the vapours of the volatile constituent.

Figure 1:
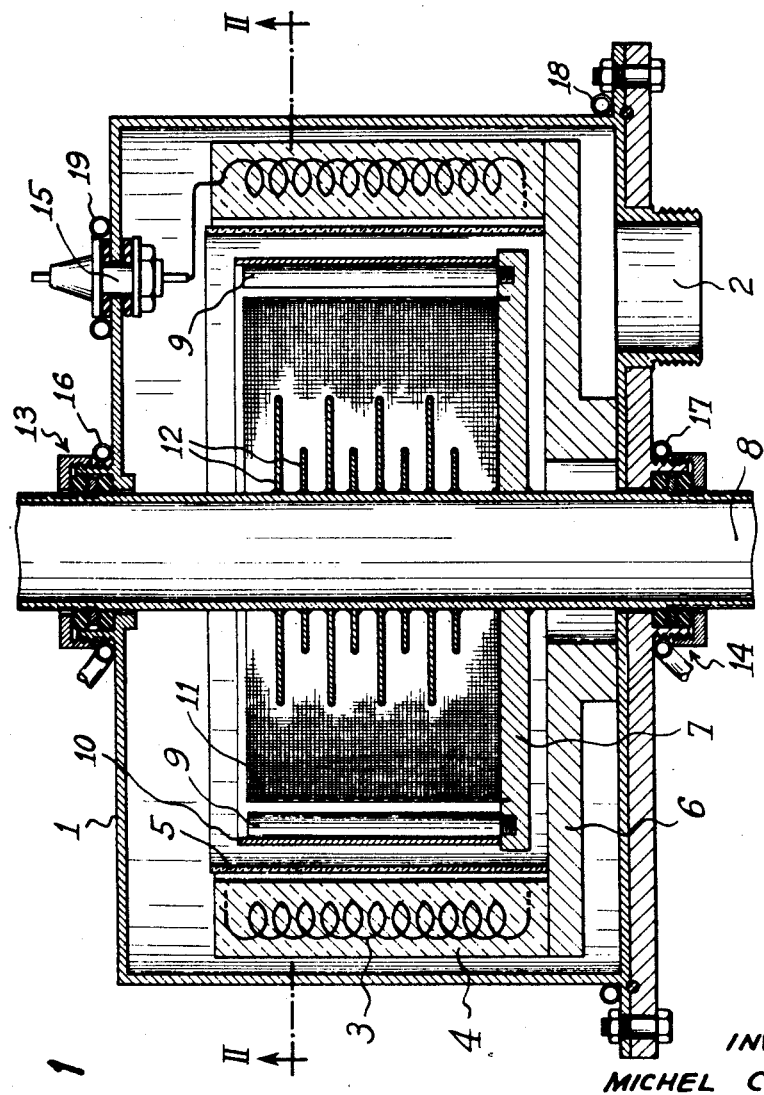
Figure 2:
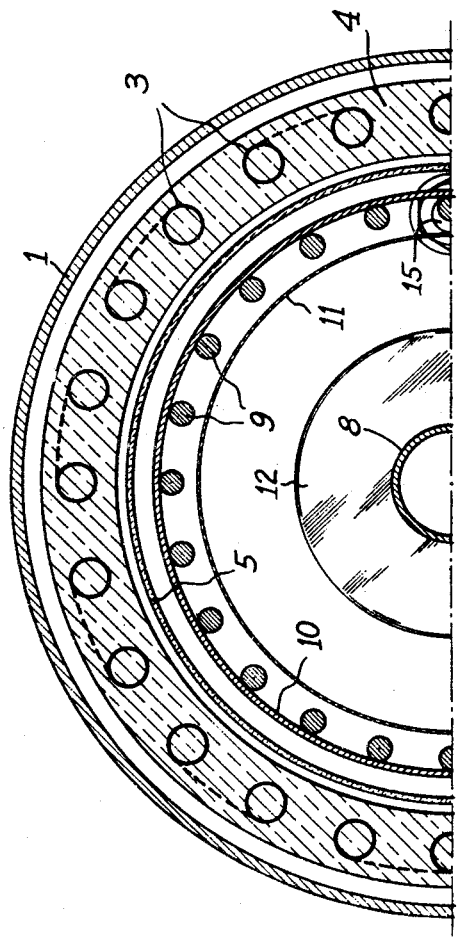

One embodiment, chosen by way of example and not of limitation, of the vacuum vapourisation furnace to which the present invention relates, is described hereinafter with reference to Figures 1 and 2 of the accompanying diagrammatic drawings, in which:

Figure 1 is a vertical section through a vapourisation furnace constructed in accordance with the invention, and Figure 2 is a half-section on line II—II of Figure 1.

These figures show only those elements which are necessary to enable the invention to be understood.

The furnace shown in Figures 1 and 2 comprises a vacuum chamber 1 communicating through an aperture 2 with a vacuum pump not shown in the drawing, and heating resistances 3 covered by a refractory material 4 and protected by mica plates 5. The refractory material 4 and the plates 5 are supported by a fixed frame 6.

The furnace also comprises a rotating container consisting of a platform 7 rigid with a hollow shaft 8, and vertical insulating rods 9 made for instance of silica. The metal band 10 to be dezincified is laid on these rods 9.

The furnace also comprises a perforated screen 11 rigid with the platform 7. This screen prevents the return of the zinc vapours to the metal band 10; the vapour tension of the volatile constituent coming away from the bands is actually greater between the band 10 and the screen 11 than inside this screen.

The rotation of the container ensures uniform heating of the metal band which is being treated; it also ensures regular condensation of the vapours of the volatile constituent, by a kind of stirring of these vapours.

The furnace also comprises a system for condensation of the zinc vapours; this system consists of the hollow shaft 8 through which a current of cold water passes and which is provided with vanes 12. Gas-tightness between the shaft 8 and the chamber 1 is ensured by rotary seals 13 and 14.

The furnace also comprises gas-tight passages such as 15, through which current is supplied to the heating resistances, and refrigeration circuits 16, 17, 18 and 19 ensuring the cooling of the different gas-tight seals.

What we claim is:

A vacuum furnace, comprising in combination a cylindrical chamber constructed and arranged to be evacuated, peripheral electrical resistances disposed inside the chamber and constructed and arranged to heat the chamber, refractory coverings on the resistances, plates made of an insulating material disposed inside the chamber radially inward from said resistances, a rotatable cylindrical container arranged inside said plates and coaxially with the chamber and constructed and arranged to support a metal band, a perforated cylindrical screen disposed inside the chamber and band and in the vicinity of the container and coaxially with the chamber and container, a pipe passing centrally through the chamber and constructed and arranged to conduct a cooling fluid, and vanes on the pipe, said vanes being disposed inside the chamber, whereby a volatile constituent of the band is vaporised in the chamber and condensed on the vanes.

References Cited in the file of this patent

UNITED STATES PATENTS

| | | |
|---|---|---|
| 629,008 | Frolich | July 18, 1899 |
| 1,728,371 | Shelton et al. | Sept. 17, 1929 |
| 2,195,453 | Gardner | Apr. 2, 1940 |
| 2,309,643 | Hansgirg | Feb. 2, 1943 |
| 2,864,877 | Harders et al. | Dec. 16, 1958 |